United States Patent
Cobb, Jr.

(10) Patent No.: US 6,293,235 B1
(45) Date of Patent: Sep. 25, 2001

(54) COMPRESSED AIR ASSISTED FUEL INJECTION SYSTEM WITH VARIABLE EFFECTIVE REFLECTION LENGTH

(75) Inventor: William T. Cobb, Jr., St. Petersburg, FL (US)

(73) Assignee: Design & Manufacturing Solutions, Inc., Tampa, FL (US)

( * ) Notice: Subject to any disclaimer, the term of this patent is extended or adjusted under 35 U.S.C. 154(b) by 0 days.

(21) Appl. No.: 09/504,056

(22) Filed: Feb. 14, 2000

Related U.S. Application Data

(63) Continuation-in-part of application No. 09/138,244, filed on Aug. 21, 1998.

(51) Int. Cl.[7] ....................................................... F02B 33/04
(52) U.S. Cl. ........................................ 123/73 B; 123/65 P
(58) Field of Search ............................. 123/73 B, 73 PP, 123/65 P

(56) References Cited

U.S. PATENT DOCUMENTS

| | | |
|---|---|---|
| 1,139,364 | 5/1915 | Obergfell . |
| 1,527,166 | 2/1925 | Bezu . |

(List continued on next page.)

FOREIGN PATENT DOCUMENTS

| | | | |
|---|---|---|---|
| 681793 | * 9/1939 | (DE) | ................................. 123/73 PP |
| 0302045 | 2/1989 | (EP) . | |
| 397695 | 6/1994 | (EP) . | |
| 2115485 | * 9/1983 | (GB) | ................................... 123/73 B |
| 77105061 | 7/1988 | (JP) . | |
| WO 96/00843 | 1/1996 | (WO) . | |
| WO 97/02424 | 1/1997 | (WO) . | |
| WO 97/22852 | 6/1997 | (WO) . | |

OTHER PUBLICATIONS

Le Moteur A Deux–Temps, A Injection Electronique, Ingenieurs de L'automobile, Nov. 1977, 26 pages by Jaulmes et al., pp 717–729, and 30 page translation of Ingenieurs de l'Automobile.

Development of A Pumpless Air Assisted Injection System for Two–cycle, S.I. Engines, R. Gentili et al., SAE, 1994, pp. 87–100.

IAPAC Compressed Air Assisted Fuel Injection for High Efficiency Low Emissions Marine Outboard Two–Stroke Engines, G. Monnier et al., SAE Paper 911849, 1991, pp. 123–135.

Delayed Charging: A Means to Improve Two–Stroke Engine Characteristics, P. Rochelle, SAE Paper 941678, 1994, pp. 1–9.

The OCP Small Engine Fuel Injection System For Future Two–Stroke Marine Engines, S. Leighton et al., SAE Paper 941687, 1994, pp. 115–122.

Diaphragm Injection Carburettor (DIC) for Stratified–Scavenging of Small Two–Stroke Gasoline Engine, X. Yang et al., SAE Paper 960364, 1996, pp. 55–62.

Diaphragm Fuel Injection System (DFI) for Stratified–Scavenging of Small Two–Stoke Gasoline Engine, X. Yang et al., SAE Paper 960365, 1996, pp. 63–71.

Improving The Exhaust Emissions of Two–Stroke Engines by Applying the Activated Radical Combustion, Y. Ishibashi et al., SAE Paper 960742, 1996, pp. 113–123.

(List continued on next page.)

*Primary Examiner*—John Kwon
(74) *Attorney, Agent, or Firm*—Harrington & Smith, LLP

(57) ABSTRACT

An internal combustion engine having a combustion chamber and a fuel delivery system for delivering fuel into the combustion chamber. The fuel delivery system includes a fuel entry proximate the combustion chamber and a combustion compression wave reflection conduit connected to the combustion chamber proximate the fuel entry. The reflection conduit comprises a variable effective reflection length.

36 Claims, 11 Drawing Sheets

U.S. PATENT DOCUMENTS

| | | | |
|---|---|---|---|
| 2,090,149 | * 8/1937 | Pollister | 123/65 P |
| 3,263,701 | 8/1966 | Johnson | 137/533.17 |
| 3,265,050 | 8/1966 | Tuckey | 123/119 |
| 3,353,525 | 11/1967 | Nutten et al. | 123/119 |
| 3,441,010 | 4/1969 | Barr et al. | 123/119 |
| 3,633,557 | 1/1972 | Tuckey | 123/119 B |
| 3,640,512 | 2/1972 | Morgenroth | 216/34 A |
| 3,738,623 | 6/1973 | Tuckey | 261/35 |
| 3,743,254 | 7/1973 | Tuckey | 261/34 A |
| 3,765,657 | 10/1973 | Du Bois | 261/37 |
| 3,870,025 | 3/1975 | Anderson et al. | 123/139 AF |
| 3,933,949 | 1/1976 | Woody | 261/35 |
| 4,159,012 | 6/1979 | Pizzuto et al. | 123/65 R |
| 4,210,105 | 7/1980 | Nohira et al. | 123/277 |
| 4,258,670 | 3/1981 | Thery | 123/73 B |
| 4,340,016 | 7/1982 | Ehrlich | 123/73 R |
| 4,378,762 | 4/1983 | Ehrlich | 123/73 PP |
| 4,383,503 | 5/1983 | Griffiths | 123/73 PP |
| 4,455,266 | 6/1984 | Gerhardy | 261/35 |
| 4,628,881 | 12/1986 | Beck et al. | 123/447 |
| 4,628,888 | 12/1986 | Duret | 123/531 |
| 4,693,224 | 9/1987 | McKay | 123/531 |
| 4,716,877 | 1/1988 | Duret | 123/531 |
| 4,770,132 | 9/1988 | Sougawa | 123/73 A |
| 4,781,164 | 11/1988 | Seeber et al. | 123/533 |
| 4,794,902 | 1/1989 | McKay | 123/533 |
| 4,813,391 | 3/1989 | Geyer et al. | 123/73 C |
| 4,846,119 | 7/1989 | Geyer et al. | 123/73 C |
| 4,917,073 | 4/1990 | Duret | 123/73 C |
| 4,944,255 | 7/1990 | Duret | 123/65 EM |
| 4,995,349 | 2/1991 | Tuckey | 123/65 VB |
| 5,027,759 | 7/1991 | Luo | 123/73 PP |
| 5,027,765 | 7/1991 | Duret | 123/316 |
| 5,060,602 | 10/1991 | Maissant | 123/47 A |
| 5,105,775 | 4/1992 | Maissant | 123/70 R |
| 5,197,417 | 3/1993 | Tuckermann et al. | 123/73 C |
| 5,197,418 | 3/1993 | Wissmann et al. | 123/73 C |
| 5,203,310 | 4/1993 | Gatellier | 123/568 |
| 5,215,064 | 6/1993 | Monnier et al. | 123/532 |
| 5,273,004 | 12/1993 | Duret et al. | 123/73 V |
| 5,284,111 | 2/1994 | Geyer et al. | 123/73 C |
| 5,285,753 | 2/1994 | Duret et al. | 123/65 V |
| 5,351,668 | 10/1994 | Gatallier | 123/568 |
| 5,353,754 | 10/1994 | Wissmann et al. | 123/73 C |
| 5,365,893 | 11/1994 | Wissmann et al. | 123/73 C |
| 5,375,573 | * 12/1994 | Bowman | 123/196 R |
| 5,377,637 | 1/1995 | Leighton et al. | 123/73 AD |
| 5,377,650 | 1/1995 | Warner | 123/568 |
| 5,392,828 | 2/1995 | Watson et al. | 141/330 |
| 5,419,289 | 5/1995 | Duret et al. | 123/73 B |
| 5,438,968 | 8/1995 | Johnson et al. | 123/446 |
| 5,441,030 | 8/1995 | Satsukawa | 123/491 |
| 5,443,045 | 8/1995 | Marconi | 123/299 |
| 5,477,822 | 12/1995 | Haghgooie et al. | 123/286 |
| 5,477,833 | 12/1995 | Leighton | 123/497 |
| 5,483,943 | 1/1996 | Peters | 123/527 |
| 5,483,944 | 1/1996 | Leighton | 123/531 |
| 5,503,119 | 4/1996 | Glover | 123/73 B |
| 5,546,902 | 8/1996 | Paluch et al. | 123/304 |
| 5,551,638 | 9/1996 | Caley | 239/453 |
| 5,558,070 | 9/1996 | Bell et al. | 123/568 |
| 5,579,735 | 12/1996 | Todero et al. | 123/317 |
| 5,588,408 | 12/1996 | Kurihara | 123/196 W |
| 5,609,137 | 3/1997 | Rembold et al. | 123/382 |
| 5,622,155 | 4/1997 | Ellwood et al. | 123/531 |
| 5,628,295 | 5/1997 | Todero et al. | 123/568 |
| 5,645,026 | 7/1997 | Schlessmann | 123/184.46 |
| 5,685,273 | 11/1997 | Johnson et al. | 123/446 |

OTHER PUBLICATIONS

Pro–Ject Air–Assisted Fuel Injection System for Two–Stoke S.I. Engines, R. Gentili et al., SAE Paper 960360, pp. 1–6.

Application of Direct Air–Assisted Fuel Injection to a SI Cross–Scavenged Two–Stroke Engine, R. G. Kenny, et al., SAE Paper 932396, 1993, pp. 37–50.

"The Orbital Combustion Procss for Future Small Two–Stroke Engines", S. Leighton et al., *A New Generation of Two–Stroke Engines for the Future?*, 1993, pp. 195–206.

New Developments for Clean Marine Outboard Two–Stroke Engines, P. Duret, *A New Generation of Two–Stroke Engines for the Future?*, 1993, pp. 125–145.

A Trial For Stabilizing Combustion in Two–Stroke Engines at Part Throttle Operation, Y. Ishibashi et al., *A New Generation of Two–Stroke Engines for the Future?*, 1993, pp. 113–124.

"IAPAC Two–Stroke Engine for High Efficiency Low Emissions Scooters", G. Monner et al., *A New Generation of Two–Stroke Engines for the Future?*, 1993, pp. 101–111.

"The IAPAC Fluid Dynamically Controlled Automotive Two–Stroke Combustion Process", P. Duret et al., *A New Generation of Two–Stroke Engines for the Future?*, 1993, pp. 77–98.

SAE Technical Paper Series, "Development of a Fuel Injected Two–Stroke Gasoline Engine", D. Plohberger et al., Paper No. 880170, 1988, 17 pages.

"Recent Research Activities on Small Diesel and Gasoline Engines", K. Landfahrer, C372/018, 5 pages.

Advertisement, "AVL SDIS, Semi Direct Injection System", AVL List Gmbh, 1 page.

SCIP: A New Simplified Camless IAPAC Direct Injection for Low Emission Small Two–Stroke Engines, J. Dabadie, SAE Paper, 10 pages.

"Emission and Fuel Consumption Reduction in a Two–Stroke Engine Using Delayed–Charging" by Rochelle, SAE Paper 951784, 1995, pp. 217–226.

RedMax Scores With Air head Engine, Power Equipment Trade, Jul. 1998, p. 74.

"Tanaka Meets CARB Tier II With New PureFire Engine" By Ken Morrision, Power Equipment Trade, Jul. 1998, pp. 16–22 and 116.

* cited by examiner

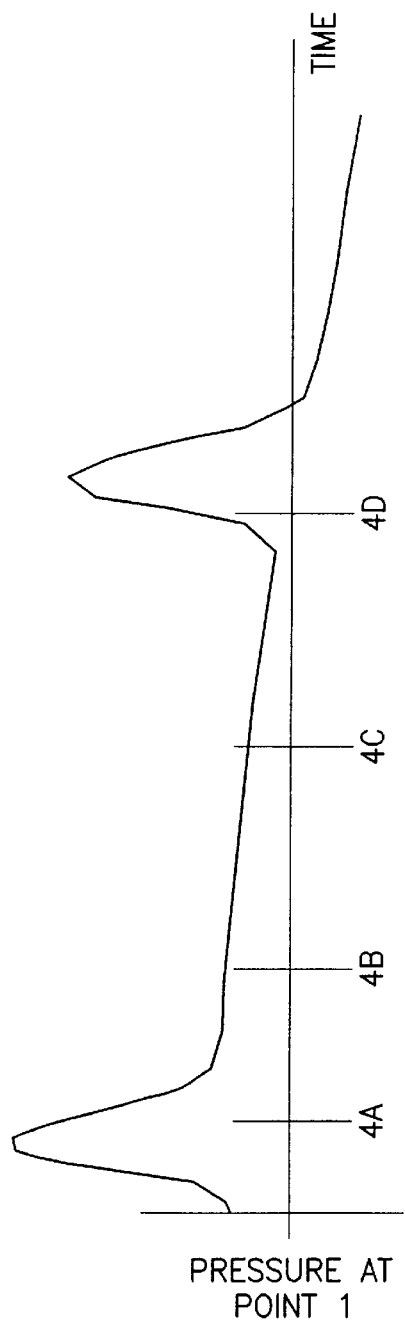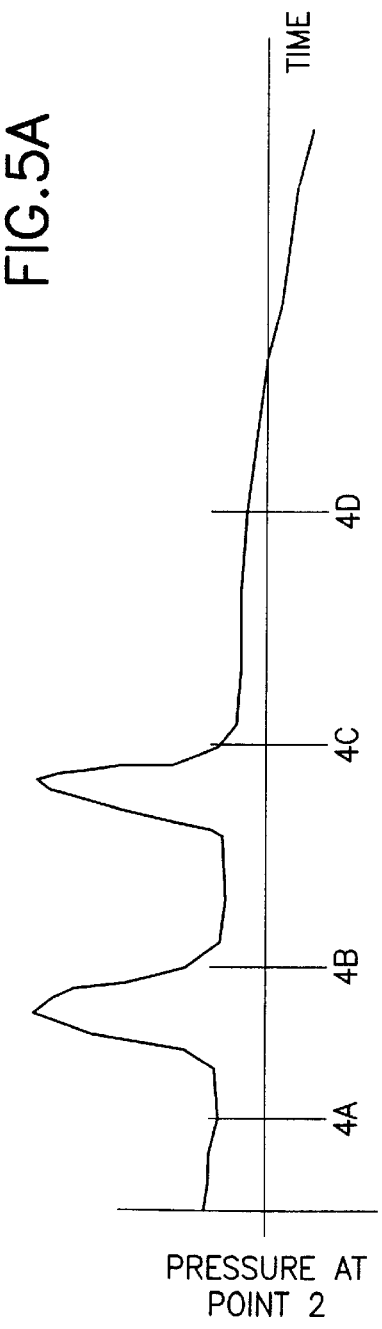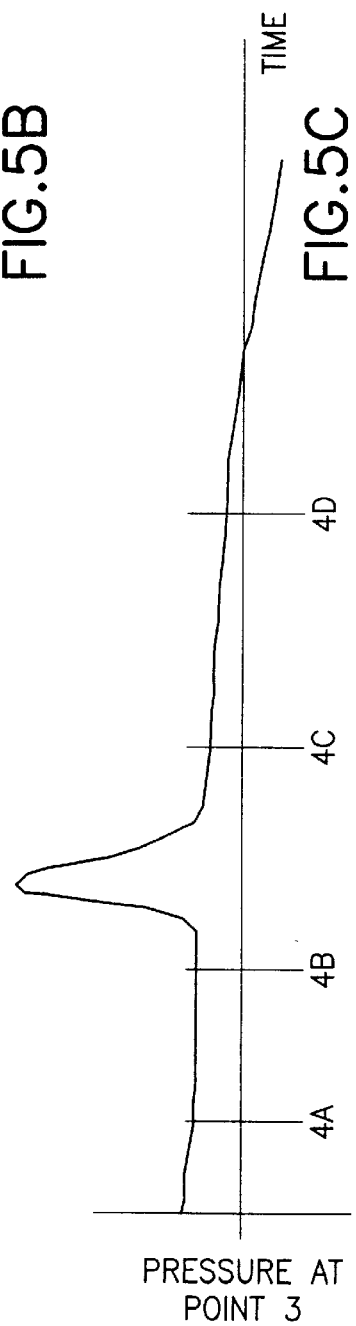

COMPRESSED AIR ASSISTED FUEL INJECTION SYSTEM WITH VARIABLE EFFECTIVE REFLECTION LENGTH

CROSS-REFERENCE TO RELATED APPLICATION

This is a continuation-in-part application of co-pending application Ser. No. 09/138,244 filed Aug. 21, 1998.

BACKGROUND OF THE INVENTION

The present invention relates to fuel injection systems for internal combustion engines and, more specifically, to the control of a low pressure injection in an internal combustion engine. A particular field of application of the invention is a two-stroke internal combustion engine. The specific application described is to a small high speed two-stroke engine, such as utilized in handheld power equipment such as leaf blowers, string trimmers and hedge trimmers, also in wheeled vehicle applications such as mopeds, motorcycles and scooters and in small outboard boat engines. The small two-stroke engine has many desirable characteristics, that lend themselves to the above applications, including: simplicity of construction, low cost of manufacturing, high power-to-weight ratios, high speed operational capability and, in many parts of the world, ease of maintenance with simple facilities.

The prominent drawback of the simple two-stroke engine is the loss of a portion of the fresh unburned fuel charge from the cylinder during the scavenging process. This leads to poor fuel economy and, most importantly, high emission of unburned hydrocarbon, thus rendering the simple two-stroke engine incapable of compliance with increasingly stringent governmental pollution restrictions. This drawback can be relieved by separating the scavenging of the cylinder, with fresh air, from the charging of the cylinder, with fuel. This separation can be achieved by injecting the liquid fuel into the cylinder or more preferably by injecting the fuel charge by utilizing a pressurized air source, separate from the fresh air scavenge, to spray the fuel into the cylinder. In a preferred embodiment of the present invention, the displacement size of the engine is about 16 cc to about 100 cc, but could be larger or smaller. These sizes of engines are used for such things as string trimmers, chain saws, leaf blowers, and other hand held power tools. The engine could also be used on a tool such as a lawn mower, snow blower or motor boat outboard engine.

SUMMARY OF THE INVENTION

In accordance with one embodiment of the present invention, an internal combustion engine is provided having a combustion chamber and a fuel delivery system for delivering fuel into the combustion chamber. The fuel delivery system includes a fuel entry proximate the combustion chamber and a combustion compression wave reflection conduit connected to the combustion chamber proximate the fuel entry. The reflection conduit comprises a variable effective reflection length.

In accordance with another embodiment of the present invention, an internal combustion engine fuel delivery assist is provided comprising a combustion compression wave reflector; and a control system connected to the reflector for at least partially controlling the reflector to vary timing of delivery of a reflected combustion compression wave to a predetermined location of an engine.

In accordance with another embodiment of the present invention, an internal combustion engine is provided having a combustion chamber and a fuel delivery system for delivering fuel into the combustion chamber. The fuel delivery system includes a fuel entry proximate the combustion chamber and a combustion compression wave reflector connected to the combustion chamber. The reflector is variable based upon at least one engine operating parameter of the engine.

In accordance with another embodiment of the present invention, an internal combustion engine fuel delivery assist system is provided comprising a variable combustion compression wave reflector comprising a reflection conduit; and a control system for selectively actuating and deactuating effective combustion compression wave reflection by the reflector.

In accordance with another embodiment of the present invention, an internal combustion engine fuel delivery system for an engine is provided comprising a fuel injector; a combustion compression wave reflection system, the fuel injector having a fuel exit into a conduit of the reflection system; and a controller connected to the fuel injector. The controller is adapted to operate the fuel injector in a first mode when the reflection system comprises a reflected combustion compression wave and in a second different mode when the reflection system does not comprise a reflected combustion compression wave.

In accordance with one method of the present invention, a method of delivering pressure pulses in an internal combustion engine is provided. The method comprising steps of producing a combustion compression wave from combustion in a combustion chamber of the engine; conduiting at least a portion of the wave in a reflection pipe conduit connected to the combustion chamber; reflecting the wave portion in the conduit back towards the combustion chamber; and varying timing of delivery of the reflected wave portion back to the combustion chamber.

BRIEF DESCRIPTION OF THE DRAWINGS

The foregoing aspects and other features of the present invention are explained in the following description, taken in connection with the accompanying drawings, wherein:

FIGS. 5A–5C are pressure diagrams of for three points along the length of the accumulator conduit;

Figure 10:
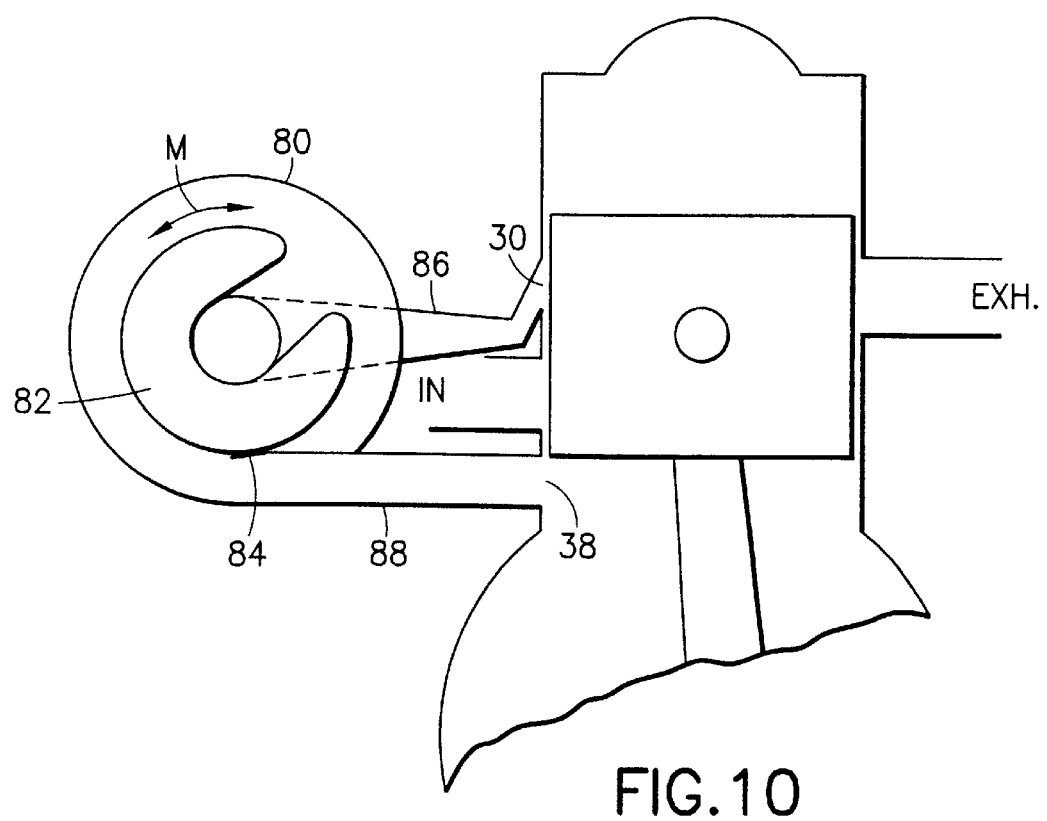
Figure 11:
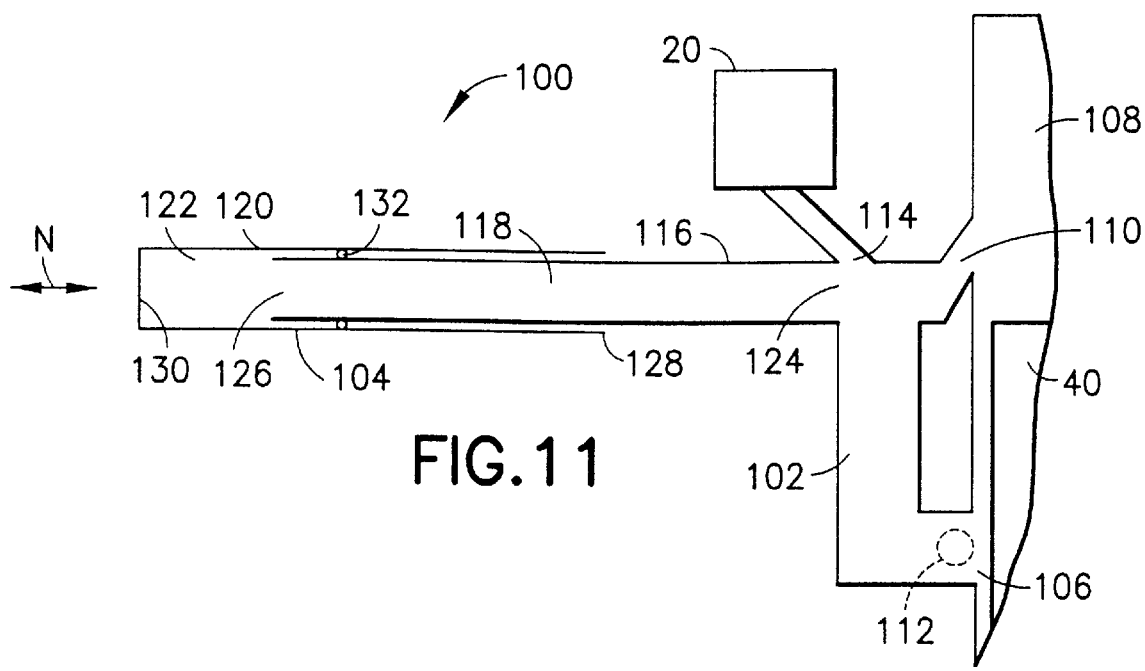
Figure 12:
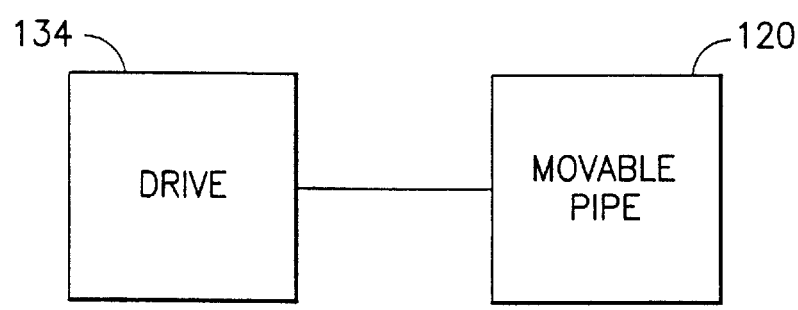
Figure 13:
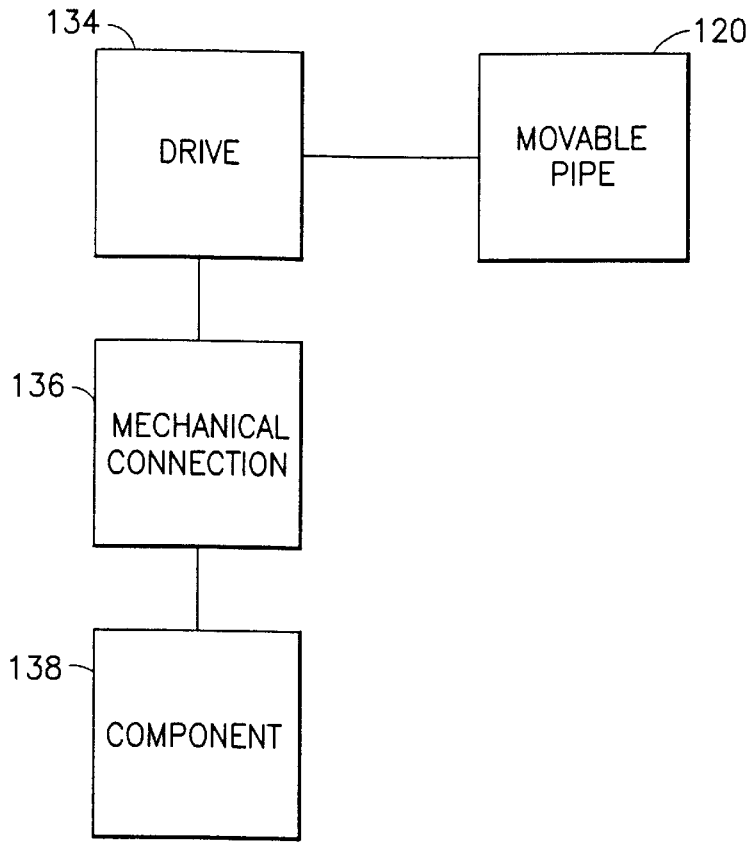
Figure 14:
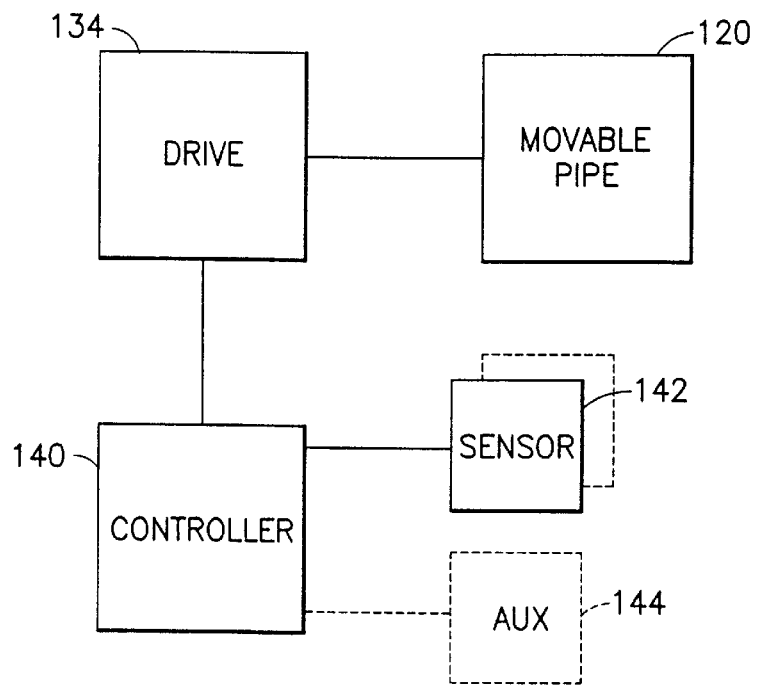
Figure 15:
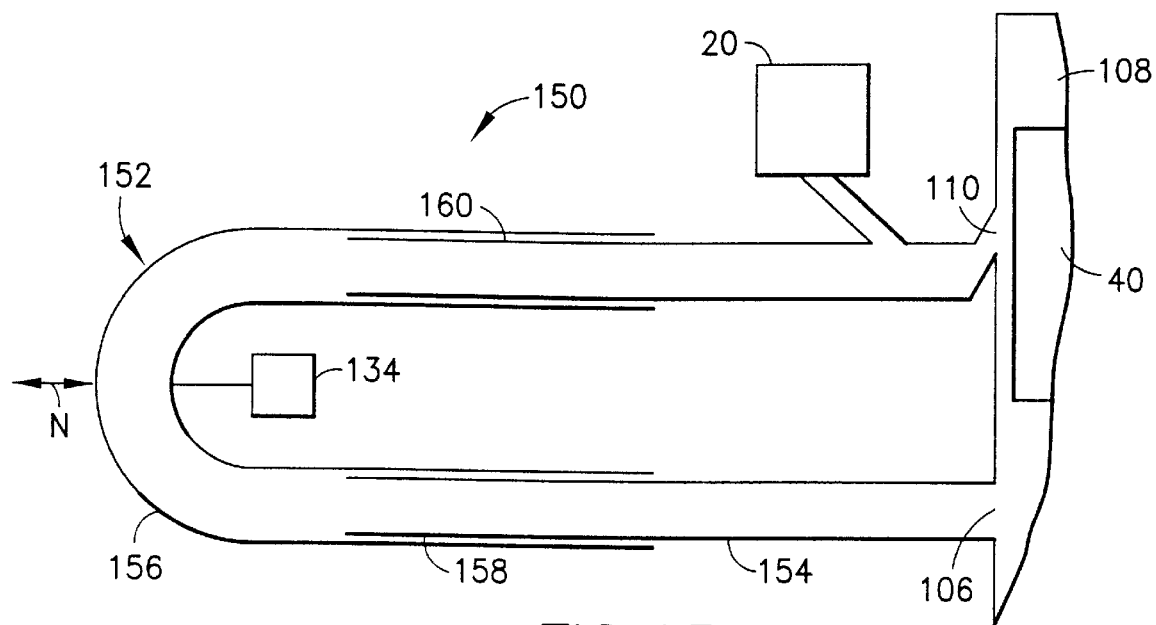
Figure 17:
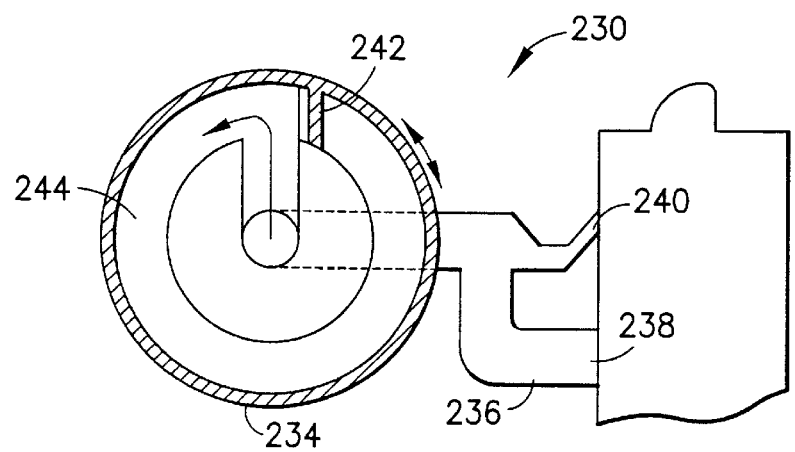
Figure 16A:
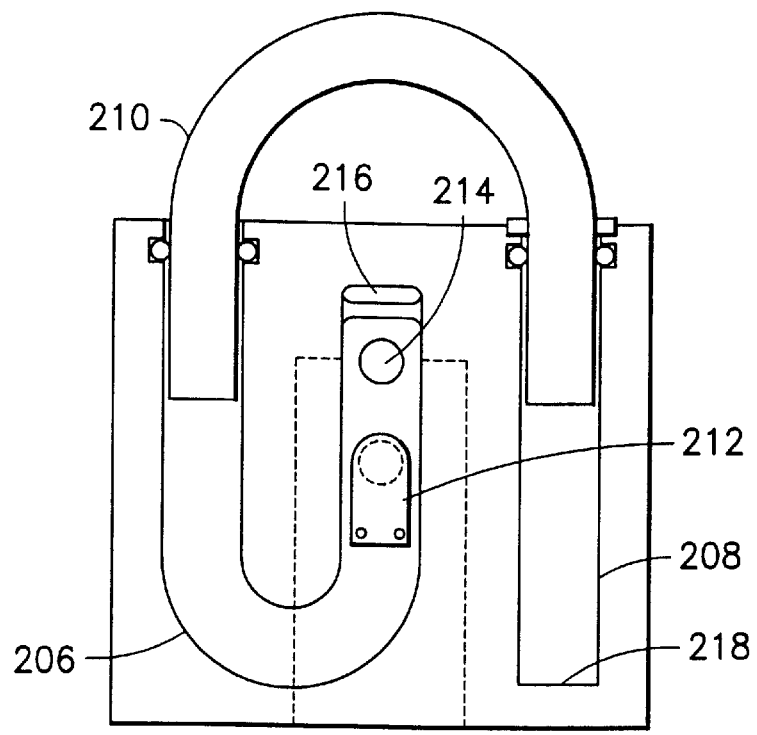
Figure 16B:
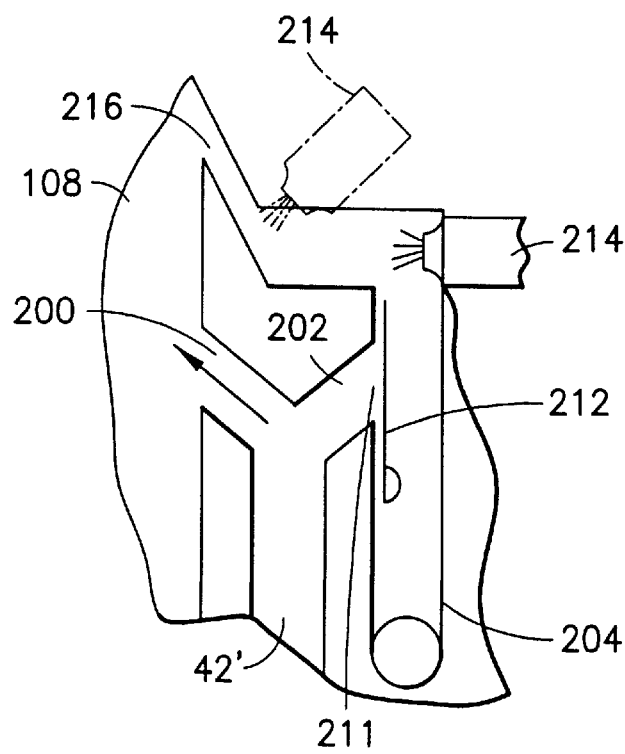

9 is a partial schematic diagram of an engine with an alternate embodiment of the accumulator;

FIG. 10 is a partial schematic diagram of an engine with another alternate embodiment of the accumulator;

FIG. 11 is a schematic view of an alternate embodiment of the present invention;

FIG. 12 is a block diagram of a system used for the embodiment shown in FIG. 11;

FIG. 13 is a block diagram of a system used for the embodiment shown in FIG. 11;

FIG. 14 is a block diagram of another alternate embodiment of a control system;

FIG. 15 is a schematic view of an alternate embodiment of the present invention;

FIGS. 16A and 16B are schematic views of another alternate embodiment of the present invention; and FIG. 17 is a schematic view of another alternate embodiment of the present invention.

DETAILED DESCRIPTION OF THE PREFERRED EMBODIMENTS

Figure 1C:
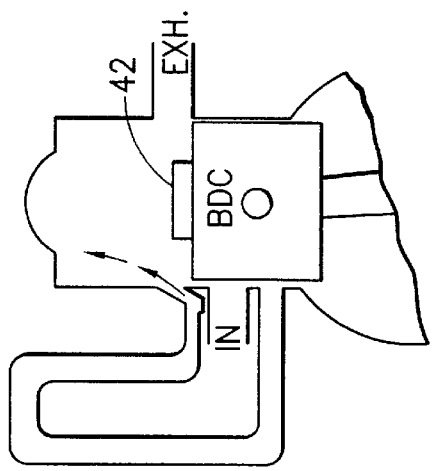
FIGS. 1A–1E are partial schematic diagrams of an engine incorporating features of the present invention with the piston head at various different operational positions.
Figure 1B:
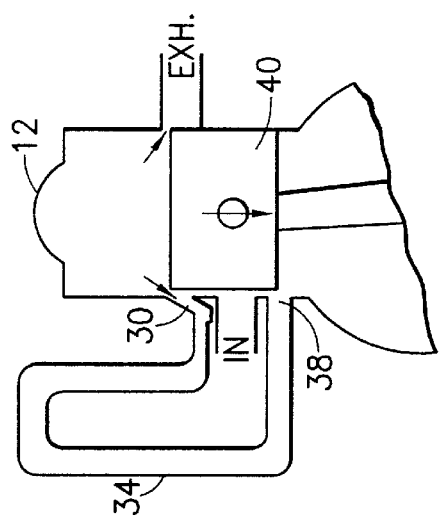
Figure 1A:
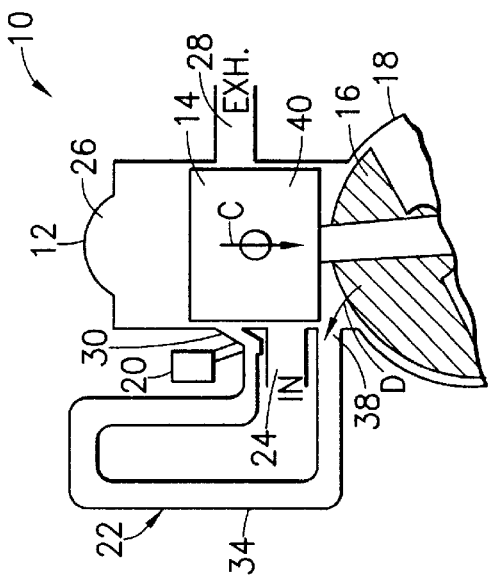

Referring to FIG. 1A, there is shown a schematic view of an internal combustion engine 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

The engine 10 is a two-stroke engine having a cylinder 12, a piston 14, a crankshaft 16, a crankcase 18, and a fuel injection system 22 having a fuel metering system 20. The cylinder 12 has a spark plug (not shown) connected to its top, a bottom which is connected to the crankcase 18, an air inlet 24, a combustion chamber 26, an exhaust outlet 28, and an injection port or inlet 30 into the combustion chamber. The fuel metering system 20 could be any suitable type of system, such as a carburetor or electronic fuel injector. However, an advantage of the present system is that there is no need for high precision timing or spray quality for the fuel metering system. A relatively simple metering system that delivers drops of fuel could be used. In the embodiment shown in FIG. 1A the injection port 30 is an open type of port; i.e.: with no flow check valve into the combustion chamber 26. Features of the present invention could be combined with the invention disclosed in U.S. patent application Ser. No. 09/065,374 which is hereby incorporated by reference in its entirety. The injection port 30 is located in a side wall of the cylinder 12 and is shaped to input fuel and air in an upward direction towards the top of the cylinder head. However, in alternate embodiments the inlet could be located in the top of the cylinder head or be shaped to direct fuel towards the top of the piston 14.

The fuel injection system 22 is a compressed air assisted system. The injection system 22 comprises an accumulator 34. The accumulator 34, in this embodiment, has an inlet 38 connectable to pressure inside the crankcase 18 and an exit at the injection port 30. The accumulator 34 functions as a collector and temporary storage area for compressed air. In this embodiment the source of the compressed air is air scavenged from the crankcase 18.

The piston 14 compresses the air in the crankcase 18 on the piston's downward stroke. In a preferred embodiment the two apertures 30, 38 are both provided in the cylinder 12; one above the air inlet 24 and one below the air inlet. In the preferred embodiment both apertures 30, 38 are piston ported. In other words, the piston head 40 is sized and shaped to open and close access through the apertures 30, 38 as the piston head 40 reciprocates up and down in the cylinder 12. The accumulator 34, in this embodiment, is a simple channel between the two apertures 30, 38. However, in alternate embodiments more complicated shapes could be provided as further understood from the description below. The channel 34 could be partially machined into an exterior surface of the cylinder 12 with a cap then being attached to the cylinder to form and enclose the channel 34 with only the two apertures 30, 38. However, the accumulator could be provided in a separate member attached to the cylinder 12. In the preferred embodiment an exit from the fuel metering system 20 is located in the channel 34 proximate the injection port 30.

Figure 1E:
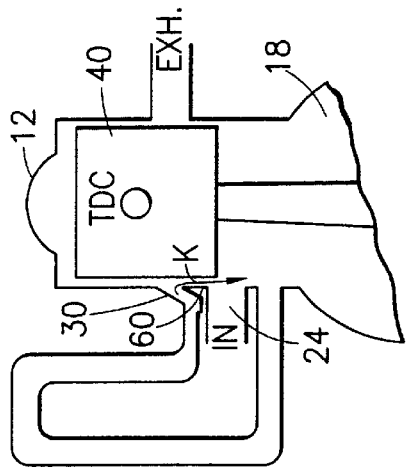
Figure 1D:
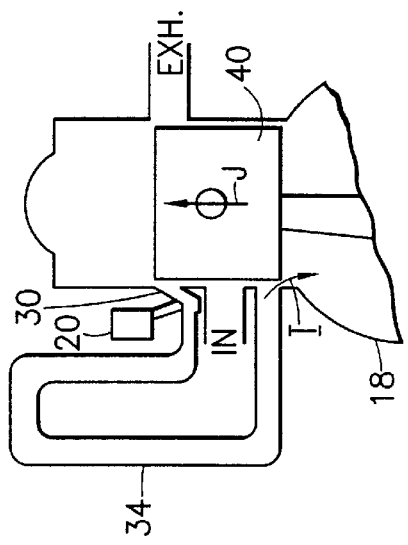
Figure 2:
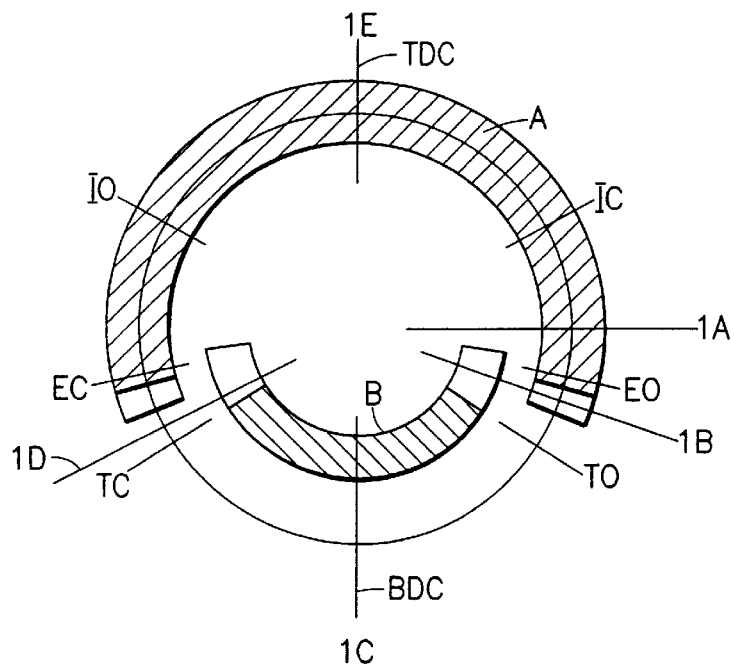
FIG. 2 is a diagram illustrating open and closed positions of the two apertures of the accumulator based upon crankcase rotation and resulting piston head positioning.
Figure 3:
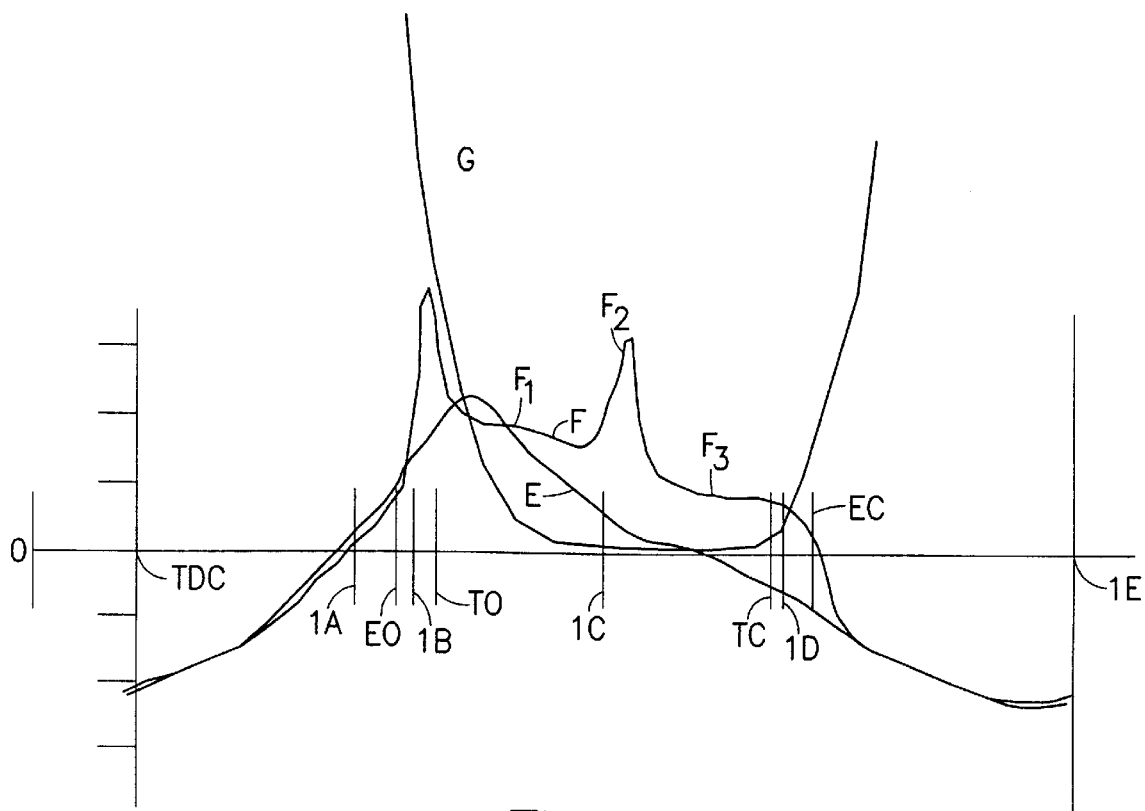
FIG. 3 is a graph of pressures in the crankcase, combustion chamber and accumulator relative to piston head positioning in the cylinder.

As will be further described below, the fuel injection system 22 has minimal moving parts; merely whatever moving parts are in the fuel metering device 20. Otherwise, the fuel injection system 22 uses the piston head 40 to open and close its ports 30, 38. Timing of the opening and closing of the ports 30, 38 will be dependent upon location of the ports along the length of the cylinder 12. Referring to FIGS. 1A–1E and 2 the operation of the injection system will now be described. FIG. 2 is intended to illustrate a line of events of opening and closing of the apertures 30, 38 during a single full piston cycle (which results from a 360° rotation of the crankshaft 16) as a 360° chart corresponding to piston head location as based upon angular position of the crankshaft 16 starting at the top dead center (TDC) position of the piston 14. Area A indicates when the piston head 40 blocks the aperture 30. Area B indicates when the piston head 40 blocks the aperture 38. At TDC the inlet 30 is blocked by the side of the piston head 40. At TDC the aperture 38 is open. The air inlet 24 is closed by the piston head at position IC which is about 60° after top dead center (ATDC). FIG. 1A shows the piston head 40 at about 90° ATDC as indicated by position 1A in FIG. 2 moving downward in the cylinder 12 as shown by arrow C away from the top dead center position of the piston head. The piston head 40 is blocking the inlet 30, the exhaust outlet 28 and the air inlet 24, but the aperture 38 is open. With the piston head 40 moving towards the crankcase 18, air from inside the crankcase 18 is pushed into the accumulator 34 through the aperture 38 as indicated by arrow D. Referring also to FIG. 3, a graph of pressures during a single piston cycle are shown relative to zero gage, pressure of one atmosphere. At TDC the pressure E in the crankcase 18 and the pressure F in the accumulator 34 at the inlet 30 are substantially the same. They remain substantially the same as the piston head moves through position 1A. As the piston head 40 continues to move down in the cylinder 12 the exhaust outlet 28 is opened at E0. Pressure G in the combustion chamber 26, caused by expanding gases from combustion, starts to drop.

As the piston head 40 moves towards position 1B, illustrated in FIG. 1B, the aperture 30 is beginning to be opened, as the piston head 40 uncovers the aperture 30, and the aperture 38 is beginning to be closed, as the piston head 40 starts to block the aperture 38. The piston head uncovers the inlet 30 at about 100° of rotation of the crankshaft after TDC (ATDC). In this embodiment the piston head 40 completely closes the aperture 38 at about the same time the piston head opens access to the transfer channel 42 (see FIG. 1C) at position TO when the transfer 42 opens.

Figure 4B:
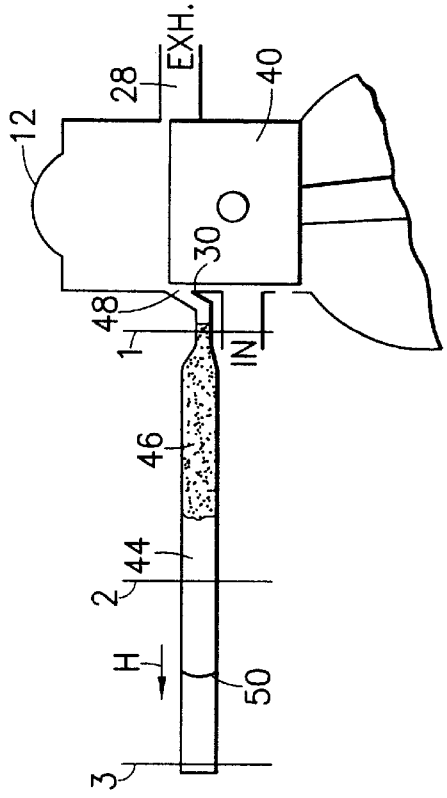
FIGS. 4A–4D are schematic diagrams similar to FIG. 1A for piston locations between 1B and 1C of FIG. 2 and showing compression wave and reflected compression wave movement.
Figure 4D:
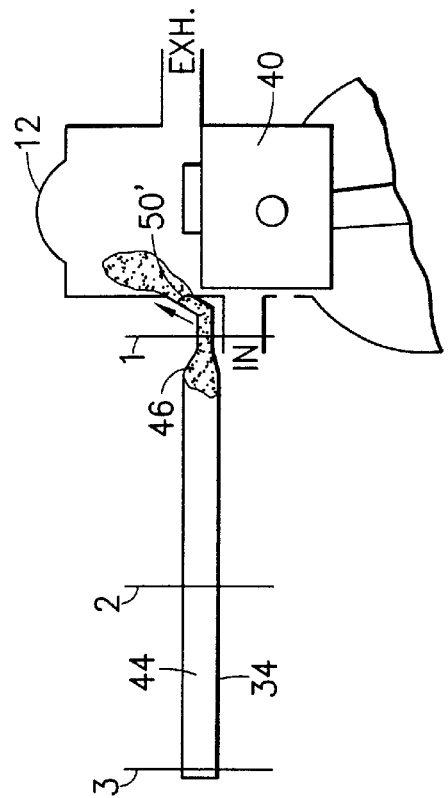
Figure 4A:
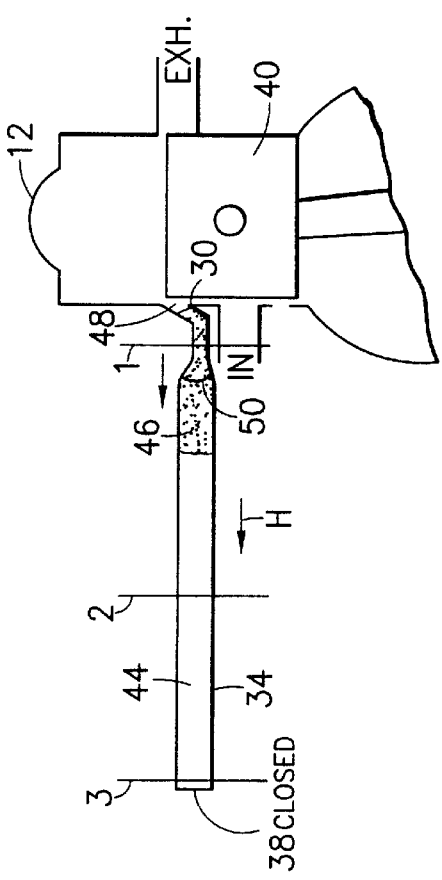

Referring also to FIGS. 4A–4D pressures and movement of gases in the accumulator 34 during the period between 1B and 1C will be further described. FIGS. 4A–4D schematically illustrate the accumulator 34 as a closed end pipe. This is because the aperture 38 is effectively closed by the piston head 40 substantially entirely while the aperture 30 is open. FIG. 4A generally corresponds to position 1B. In this position the accumulator 34 has a volume 44 of compressed air, a volume 46 of compressed air and fuel, and the beginning of a slight buffer 48 of combustion gases. In addition, a compression wave 50 enters the accumulator 34 from the aperture 30 and travels down the accumulator at the speed of sound as illustrated by arrow H towards the now closed aperture $38_{closed}$. Pressure F at the inlet 30, as seen in FIG. 3, spikes upward at 1B because of entry of combustion gases into the inlet 30 and entry of the compression wave 50.

Figure 4C:
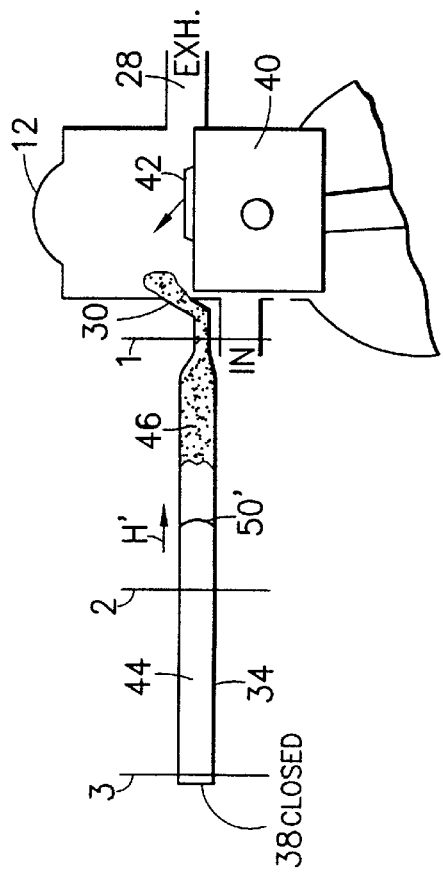

FIG. 4B corresponds to a short time later. The buffer 48 of combustion gases has further pushed into the inlet 30. The buffer 48 helps to heat the inlet 30 and helps to prevent fuel in the accumulator from directly short circuiting to the exhaust outlet 28. The compression wave 50 has moved further down the accumulator 34. FIG. 4C corresponds to a short time after the transfer 42 has opened at point TO. As seen in FIG. 3, the pressure F at the inlet 30 is now higher than the pressure G in the combustion chamber because of gases exiting the exhaust outlet 28. Therefore, the buffer 48 is pushed into the cylinder 12 (acting as a delay before entry of the air and fuel 46) and the air and fuel 46 start to enter the cylinder 12. The compression wave 50 has reflected off of the closed aperture $38_{close}$ and, more specifically, reflected off of the side of the piston head 40 covering the aperture 38. Thus, the compression wave 50 has become the reflected compression wave 50'. The reflected compression wave 50' is now traveling up the accumulator 34 back towards the inlet 30 as indicated by arrow H'. FIG. 4D corresponds to about the position 1C when the piston head is at bottom dead center (BDC). This generally corresponds to the BDC position shown in FIG. 1C. The reflected compression wave 50' arrives at the inlet 30 and exits into the cylinder 12. This causes a second spike in the pressure F at the inlet 30 as seen on FIG. 3. This second spike of pressure helps to propel fuel and air into the cylinder 12 at an accelerated rate. The compression wave is essentially an acoustic wave. Thus, the wave travels at the speed of sound. The timing of the delivery of the reflected compression wave back to the injection inlet 30 can be varied by varying the length of the accumulator conduit. A shorter accumulator conduit will deliver the reflected wave sooner and a longer accumulator conduit will deliver the reflected wave later. Thus, the length of the accumulator conduit 34 can be selected to deliver the reflected compression wave back to the injection inlet 30 at any suitable time. As shown in FIG. 3, there are three general groups of pressures of air and fuel $F_1$, $F_2$, $F_3$ exiting the inlet 30 into the cylinder and, thus, three corresponding rates of flow during these three pressure periods. Hence, a first volume from the inlet 30 will enter the cylinder 12 at a first rate, a subsequent second volume will enter the cylinder at a second higher rate, and a subsequent third volume will enter the cylinder at a third lower rate. However, in an alternate embodiment the accumulator can be configured to deliver the reflected compression wave closer to the period 1D when the inlet 30 is about to be closed. Thus, only two different rate periods need be provided. Alternatively, the accumulator could be configured to deliver more than one reflected compression wave back to the inlet 30, such as by providing the accumulator with multiple channels or multiple reflection surfaces. In effect, by closing the aperture 38 and using the closed aperture as a reflection area, the accumulator 34 functions as a tuned reflection pipe for the compression wave 50.

Referring also to FIGS. 5A–5C, charts of pressure on a reference scale at points 1, 2 and 3 in FIGS. 4A–4D are shown relative to time. Pressure at point 1 increases at time 4A corresponding to FIG. 4A when the compression wave enters the inlet 30. The pressure at point 1 trails off at times 4B and 4C corresponding to FIGS. 4B and 4C, respectively. The pressure at point 1 then sharply rises at time 4D corresponding to FIG. 4D when the reflected compression wave reaches point 1 and subsequently decreases after time 4D. FIG. 5B shows how pressure at point 2 rises just before time 4B as the compression wave 50 passes through point 2, goes down, then rises again just before time 4C as the reflected compression wave 50' passes, and then the pressure goes down again. FIG. 5C shows how point 3 merely has the one pressure spike from the compression wave's impact and reflection off of the closed aperture $38_{close}$.

As the reflected compression wave 50' exits the inlet 30 it causes the fuel and air in the cylinder 12 to be greatly disturbed; in effect functioning as a shock wave. This helps to atomize the fuel and distribute the fuel better in the air. In addition, the reflected compression wave assists in removing fuel droplets that might be adhering to tips or edges of the inlet 30 by surface adhesion or surface tension. The compression wave shocks the fuel off of the surface and into the cylinder 12. The compressed air 44 continues to push out the inlet 30 until the inlet is closed by the piston head again as shown in FIG. 1D. The residual air in the accumulator 34 after the inlet 30 is closed, just after 1D, is still pressurized. The inlet 30 completely closes shortly before the exhaust outlet 28 is closed at EC. The aperture 38 opens at substantially the same time the aperture 30 is closed. However, in alternate embodiments opening of the aperture 38 could be configured to occur before the aperture 30 is closed or, alternatively, after the aperture 30 is closed. The opening of the aperture 38 functions as a blow off port to relieve residual pressure from the compressed air in the accumulator 34 back into the crankcase 18 as shown by arrow I in FIG. 1D. Relieving pressure from the accumulator 34 when the inlet 30 is closed prevents an excessive amount of fuel from being pushed between the piston head 40 and the inside cylinder wall that could otherwise raise hydrocarbon emissions.

With the piston head 40 rising as shown by arrow J in FIG. 1D towards the TDC position, crankcase pressure E drops below 1 atmosphere as seen in FIG. 3. Thus, when aperture 38 is opened, not only is pressure in the accumulator 34 relieved, but a vacuum pressure is created in the accumulator 34. This vacuum pressure is used to pull fuel from the fuel metering device 20 and thus assist in delivering fuel into the accumulator. As seen in FIG. 3, the pressure F in the accumulator 34 now generally matches the pressure E in the crankcase 18 once again. Referring also to FIG. 1E the piston head 40 is shown at its TDC position. The air inlet 24 was opened at point 10. In this embodiment the inside wall of the cylinder 12 has a groove 60 between the inlet 30 and the inlet 24. This provides a path for a small amount of fuel (containing lubricant) to pass through the groove 60 as indicated by arrow K and lubricate bearings in the piston and crankshaft. However, the groove need not be provided. In an alternate embodiment a hole could be provided between the inlet 24 and the inlet 30 which would be spaced from the inside wall of the cylinder to deliver lubricant behind the piston head. The engine 10 could have an additional or alternative lubrication system.

Figure 6:
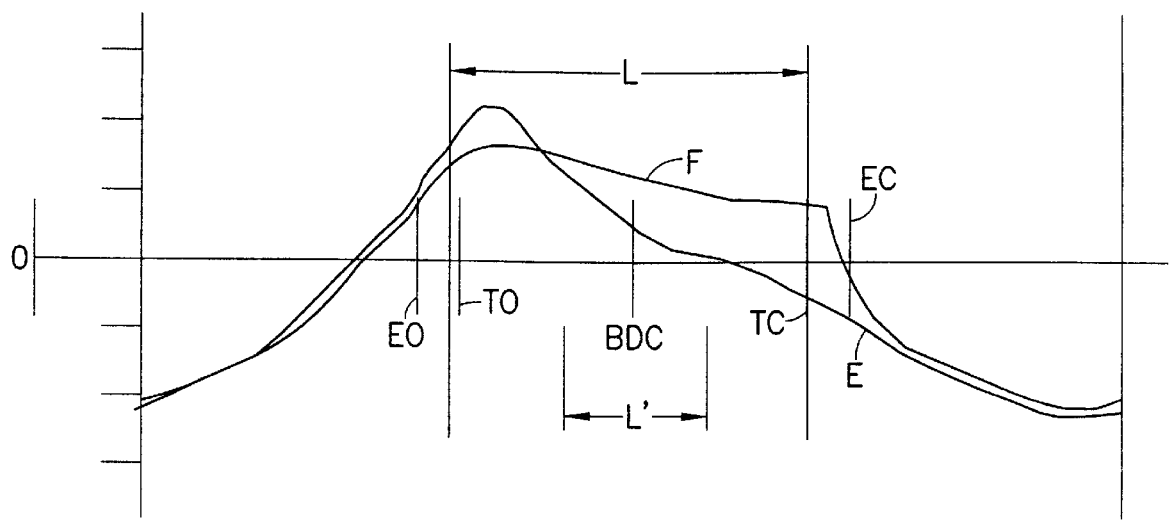
FIG. 6 is a graph as in FIG. 3 when a misfire occurs.

As is known in the art for small two stroke engines, misfires (i.e.: no combustion in the combustion chamber) can occur as much as one-third of the time. If a misfire occurs in the engine 10 a compression wave will not pass into the accumulator 34. Referring to FIG. 6 a graph of pressures E and F similar to FIG. 3 is shown when there is a misfire. L illustrates the injection period when the inlet 30 is open. The pressure F increases until the inlet 30 is opened and then it gradually decreases as the compressed air in the accumulator 34 exits the inlet 30 into the cylinder. After the inlet 30 is closed and the aperture 38 is opened, the pressure F returns to about the same pressure E as the crankcase 18. One of the features of the present invention is that the inlet aperture 30 can be sized to prevent the accumulator 34 from totally discharging into the cylinder 12. In other words, the accumulator 34 can be pressurized for the entire time that the inlet 30 is open such that compressed air is continually exerting pressure out the inlet 30 when the inlet 30 is open. This occurs regardless of whether there has been combustion or a misfire. Since the piston head 40 opens and closes all of the ports/channels 24, 28, 30, 38, 42, the engine 10 can be designed to provide different performance characteristics by changing the positions of the ports/channels 24, 28, 30, 38, 42 relative along the length of the cylinder and/or relative to each other along the length of the cylinder. This can change the timing of how long the accumulator is charged with compressed air from the crankcase, how long the accumulator blows off, how long the accumulator injects into the cylinder, etc. This can also change pressure rate changes, such as if the transfer channel, exhaust outlet or air inlet open sooner or later in the piston cycle.

Features of the above-described embodiment of the present invention have been tested on a 25 cc engine having a 75° angled injector aperture located 0.1 inch above the top of the transfer channel 42, a combined charge and blow off aperture located 0.05 inch below the bottom of the intake channel, an open air inlet, 1 psi fuel pressure with a single diaphragm fuel pump. For an average low speed of 2430 rpm, the engine produced the following:

| FUEL (g/hr) | CORRECTED POWER (kW) | HC FID (ppm) | HC (g/hr) |
|---|---|---|---|
| 64.466 | 0 | 28410.03 | 26.81 |

Where HC is hydrocarbon emission; and HC FID is total hydrocarbon emission in $C_1H_{1.85}$ equivalent as measured by a flame ionization detector. For an average high speed of 7487 rpm, the engine produced the following:

| FUEL (g/hr) | CORRECTED POWER (kW) | HC FID (ppm) | HC (g/hr) |
|---|---|---|---|
| 332.448 | 0.728 | 8438.31 | 26.97 |

This resulted in a total HC emission of 31.59 g/bhp*hr (grams/brake horse power*hour), total CO emissions of 77.25 g/bhp*hr (grams/brake horse power*hour), and total $NO_x$ emissions of 1.41 g/bhp*hr (grams/brake horse power*hour). For the average high speed (wide open throttle) average HC emission was 28.38 g/bhp*hr; average FC was 0.731 lb/hr; and average BSFC was 0.769 lb/bhp*hr, where FC is fuel consumption and BSFC is brake specific fuel consumption.

Another test of the same engine, but at a rich fuel setting was also conducted. For an average low speed of 3513 rpm, the engine produced the following:

| FUEL (g/hr) | CORRECTED POWER (kW) | HC FID (ppm) | HC (g/hr) |
|---|---|---|---|
| 79.534 | 0 | 37947.69 | 34.46 |

For an average high speed of 7496 rpm, the engine provided the following:

| FUEL (g/hr) | CORRECTED POWER (kW) | HC FID (ppm) | HC (g/hr) |
|---|---|---|---|
| 391.192 | 0.800 | 13146.97 | 42.05 |

This resulted in a total HC emission of 44.18 g/bhp*hr. In addition, total CO emission was 198.1 g/bhp*hr and total NOx emission was 1.098 g/bhp*hr. In a lean setting a total HC emission of 28.69 g/bhp*hr was obtained.

Additional test numbers were taken as follows:

| Engine Speed RPM | Fuel lb/hr | Observed hp | Intake deg. F. | SPGT deg. F. | CO % | CO2 % | O2 % | NOx ppm | HC ppm |
|---|---|---|---|---|---|---|---|---|---|
| 7460 | 0.609 | 0.74 | 88 | 441 | 0.44 | 8.48 | 9.00 | 99.9 | 8581.9 |
| 7478 | 0.668 | 0.85 | 90 | 457 | 1.02 | 9.30 | 7.51 | 133.9 | 8263.4 |
| 7494 | 0.699 | 0.89 | 93 | 469 | 1.54 | 9.42 | 6.91 | 140.8 | 8796.4 |
| 7495 | 0.722 | 0.90 | 93 | 475 | 1.94 | 9.40 | 6.60 | 144.5 | 10426.8 |
| 7503 | 0.753 | 0.93 | 95 | 477 | 2.53 | 9.15 | 6.43 | 136.9 | 11374.2 |
| 7511 | 0.795 | 0.98 | 100 | 475 | 3.16 | 8.91 | 6.28 | 132.1 | 12067.9 |
| 7512 | 0.817 | 0.98 | 108 | 475 | 3.61 | 8.69 | 6.17 | 118.7 | 13004.9 |

Figure 7:
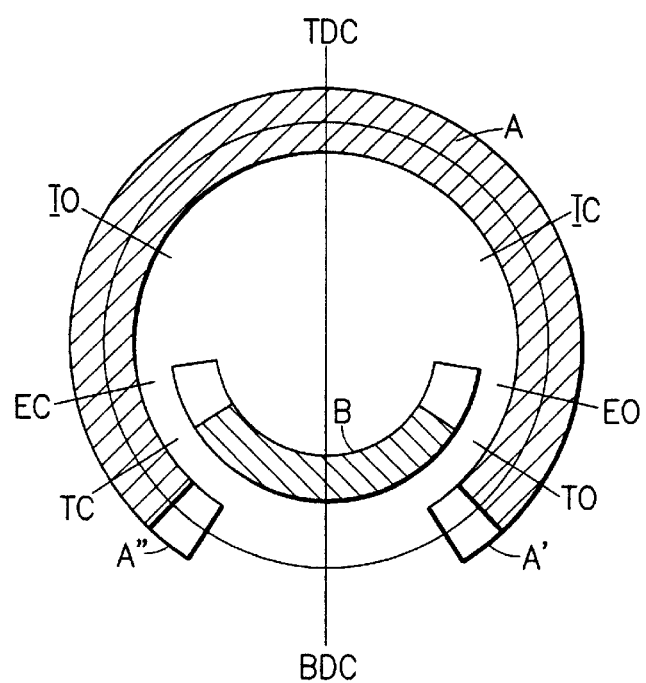
FIG. 7 is a diagram as in FIG. 2 of an alternate embodiment of the engine.

Referring now to FIG. 7, a graph similar to FIG. 2 is shown of when the two accumulator apertures are opened and closed for an alternate embodiment of the engine. In this embodiment of the engine the compressed air and fuel injection aperture is farther away from the top of the cylinder than shown in FIG. 1A. Thus, the compressed air and fuel injection aperture opens and closes at areas A' and A" closer to the BDC position of the piston head. The transfer channel is opened at TO before the injection port is opened at A' and the transfer channel is closed at TC after the injection port is closed at A". This provides an injection period L' as shown in FIG. 6. With the present invention both closures A and B can be selected merely based upon location of their respective apertures along the length of the cylinder. However, in alternate embodiments, alternative or additional means could be used to open and/or close the two accumulator ports.

Figure 8:
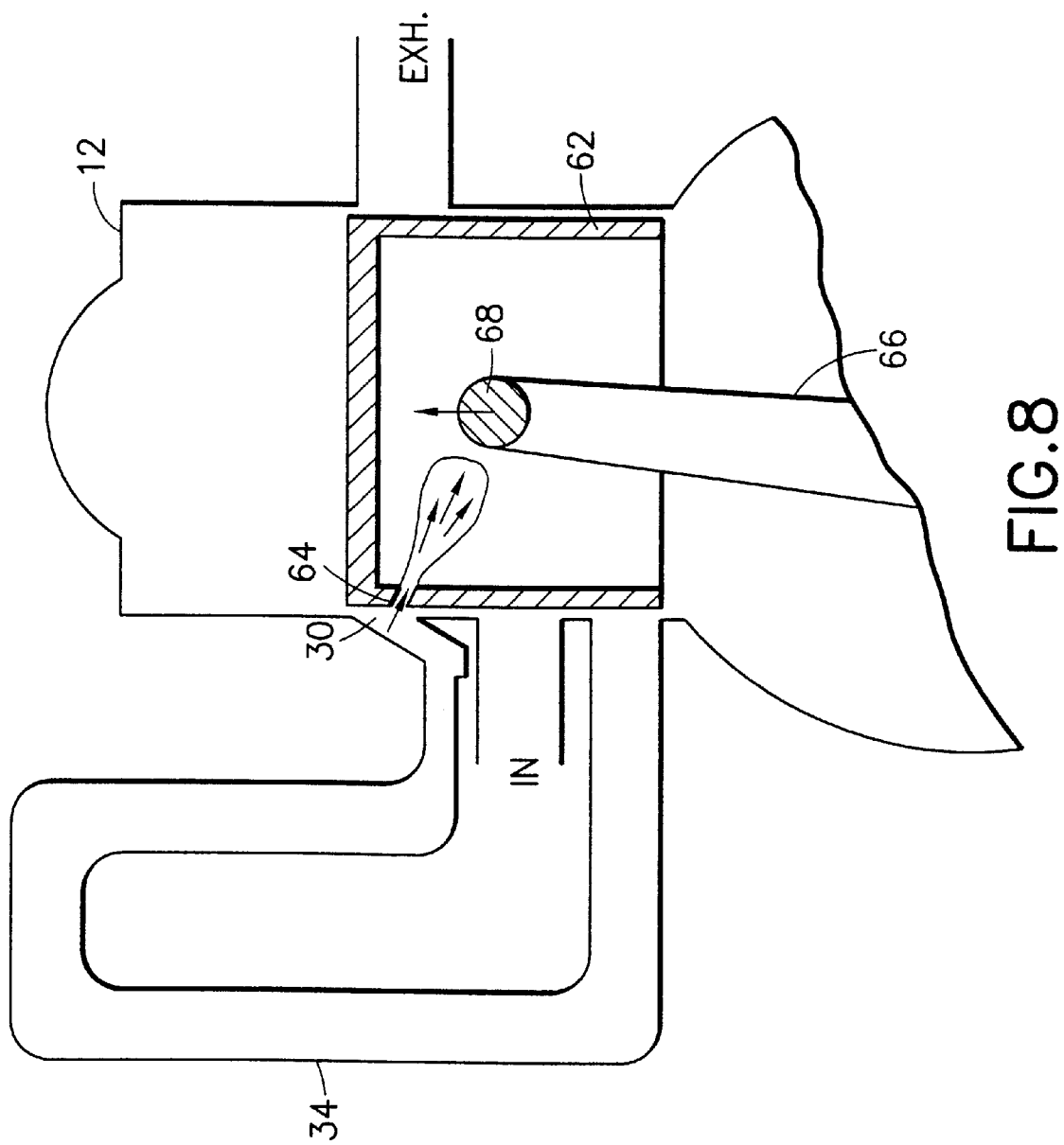
FIG. 8 is a partial schematic diagram similar to FIG. 1D of an alternate embodiment with a cross-sectional view of the piston head.

Referring now to FIG. 8, an alternative embodiment of a lubrication system for the engine is shown. In this embodiment the piston head 62 has a hole 64 through its side wall into its interior. The hole 64 is alignable with the inlet aperture 30 such that fuel (with its lubricant) can pass from the aperture 30, through the hole 64, and into the interior of the piston head 62. The piston head 62 is connected to a piston rod 66 by a bearing 68. The lubricant passing into the interior of the piston head 62 can also directly lubricate the bearing between the crankshaft and the piston rod 66. Although this type of lubrication system will increase hydrocarbon emissions, the increase is very small and, therefore, still allows the engine to pass upcoming new governmental hydrocarbon emission standards.

Figure 9:
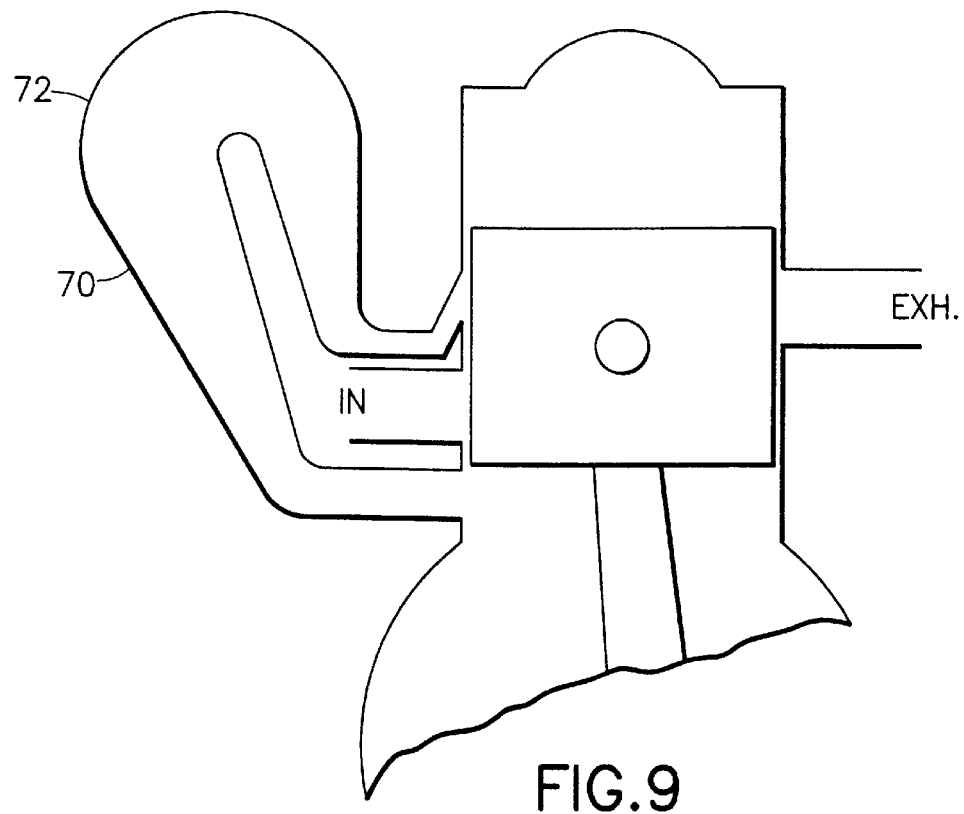

Referring now to FIG. 9 the engine is shown with an alternate embodiment of the accumulator conduit 70. As noted above, the accumulator functions as both a compressed air accumulator and as a tuned reflection pipe. In this embodiment the accumulator conduit 70 has an expansion chamber section 72 which is adapted to enlarge the length of the reflected compression wave relative to the length of the initial compression wave. Thus, the reflected compression wave is spread out over a longer period of time for a second pressure spike which is longer in time than $F_2$ shown in FIG. 3. The accumulator conduit can be configured to provide any suitable tuned pipe enhancement of the original compression wave.

Referring now to FIG. 10 the engine is shown with another alternate embodiment of the accumulator 80. In this embodiment the accumulator 80 provides a continually variable length tuned pipe which is continually variable based upon the speed of the engine. In an alternate embodiment the effective length could be variable, but need not be continually variable. The accumulator 80 has a rotatable inner pipe member 82, a sliding seal 84, a first pipe section 86 between the injection aperture 30 and the inner pipe member 82, and a second pipe section 88 between the aperture 38 an the inner pipe member 82. The inner pipe member 82 is rotatable as indicated by arrow N to vary the effective pipe length between the two apertures 30, 38. Any suitable means could be provided to rotate the inner pipe member 82 based upon the speed of the engine, such as a mechanical connection to a throttle or an electronic control device. In another alternate embodiment a sliding trombone type of variable length accumulator conduit could be provided.

Referring to FIG. 11, one such alternate embodiment of a fuel delivery system having a combustion compression wave reflection system is shown. The fuel delivery system 100 generally comprises a fuel metering or fuel injector system 20, a scavenged air passage 102, and reflector 104. The passage 102 and reflector 104 can form an accumulator. In an alternate embodiment the fuel delivery system could have a reflector without a scavenged air passage or have the reflector separate from the scavenged air passage. In this embodiment the scavenged air passage 102 extends from the crankcase at aperture 106 to the combustion chamber 108 at aperture 110. A check valve 112, such as a reed valve, ball valve or poppet valve, may be provided at the crankcase aperture 106. Alternatively, the crankcase aperture 106 could merely be piston ported by the piston head 40. The inlet aperture 106 may be from anywhere on the crankcase or from a conventional transfer port. Thus, the inlet aperture 106 does not need to go through the cylinder wall. If a vacuum type of fuel system is used, the crankcase suction wave in the passage 102 is required to draw the fuel in at area 114. Thus, the inlet aperture 106 should be piston ported through the cylinder wall.

In this embodiment the reflector 104 is a variable reflection system for reflecting a combustion compression wave back to the aperture 110 variable different timings relative to entry of the original combustion compression wave into the aperture 110 from the combustion chamber 108. In this embodiment the reflector 104 comprises a first member 116 forming a first conduit 118 and a second member 120 forming a second conduit 122. It should be understood that the conduits 118 and/or 122 could be formed in any suitable members, such as part of the cylinder wall. The second member 120 is movably connected to the first member 116. The first conduit 118 has a first open end 124 proximate area 114 and aperture 110, and a second opposite open end 126. The second conduit 122 has a first open end 128 and a closed second opposite end 130. The second member 120 extends, at least partially, around and along a length of the first member 116 with the first member extending into the open aperture 128. A suitable gas seal 132, such as an O-ring, lip seal, labyrinth or expanding ring, may be provided between the two members 116, 120 which seals off the aperture 128 from the aperture 126, but still allows the two members 116, 120 to move relative to each other. The end 130 forms a reflection area. Because the second member 120 is movable relative to the first member 116 as indicated by arrow N with a straight sliding motion, the end 130 can be moved relative to the first open end 124 and aperture 110. Thus, the effective length of the conduits 118, 122 can vary between a first effective length and a relatively longer second effective length. The first effective length can reflect a wave back to the aperture 110 in a faster time than the second effective length. Thus, the effective length of the reflector or reflection system, and the resulting time delay in delivering the reflected wave to a predetermined location, can be varied or tuned. This could be done manually or automatically. If done automatically, the change in the reflection path effective length would preferably be based upon a predetermined condition(s) or engine operating parameter or device operating condition, such as speed of the engine.

Referring also to FIG. 12, the movable reflection conduit section or pipe 120 could be connected to a drive 134. The drive 134 could be any suitable type of movement mechanism for moving the pipe 120, such as a mechanical linkage, an electric motor or solenoid, a pneumatic drive (such as from combustion gases), etc. Referring also to FIG. 13, a system is shown which includes the movable pipe 120, the drive 134, and a mechanical connection 136 to an engine or device component 138. The mechanical connection or linkage 136 could be any suitable type of connection. The component 138 could be any suitable type of moving or movable component, such as a user actuated member or system, (e.g.: a throttle trigger) or an engine component (e.g.: a governor on a crankshaft) or a device component, such as a vehicle speedometer, or transmission, or a constant velocity transmission (such as on a scooter). The drive 134 and mechanical connection 136 could be the same system, such as a cable connected between the pipe 120 and the throttle as component 138 to move the pipe between relative short length and long length positions based upon idle and wide open throttle positions of the throttle.

Referring to FIG. 14, another example of a system is shown. In this embodiment the system comprises movable pipe 120, drive 134, a controller 140 and at least one sensor 142. The system could include multiple sensors. In this embodiment the controller 140 is preferably a microprocessor, such as an engine control unit (ECU) and the drive 134 is preferably an electronically controlled electric motor or solenoid. The sensor(s) 142 are connected to the controller 140 to deliver input to the controller of predetermined characteristics, such as engine or device operating conditions or parameters. For example, the sensor 142 could be a speed sensor which senses the speed of the engine or a speed sensor or transmission sensor for sensing the speed or an operating condition of a vehicle the engine is used in. The controller 140 might also be connected to an auxiliary input device 144, such as a user actuated switch or any other suitable input device. The controller 140 can be programmed to control the drive 134 to move the pipe 120 to different positions, and thus different effective reflection lengths, based upon the input. For example, at a sensed slow or idle speed the pipe 120 could be at a long reflection length position and at a sensed fast or wide open throttle speed the pipe 120 could be moved to a short reflection length position. However, any suitable programming could be provided. For example, at a crankshaft speed of 4000 RPM the controller could be programmed to locate the pipe 120 at a position to deliver the reflected wave to the outlet 110 at about 30° ABDC (After Bottom Dead Center) and at 7000 RPM at about 10° BBDC (Before Bottom Dead Center). However, any suitable reflected wave delivery timing could be provided.

Referring now to FIG. 15, an alternate embodiment is shown. In this embodiment the fuel delivery system 150 generally comprises a fuel metering or injector system 20 and a combined accumulator and adjustable wave reflection system 152. The combined accumulator and adjustable wave reflection system 152 generally comprises a first conduit 154, a second conduit 156, and a drive 134. The drive 134 is connected to the second conduit 156 to move the second conduit relative to the first conduit 154. The first conduit 154 comprises a first section 158 and a second section 160. The first section 158 has the inlet aperture 106. The second section 160 has the outlet aperture 110. The two sections 158, 160 are connected to each other by the second conduit 156. The second conduit 156 has a general "U" shape or telescoping trombone shaped section. Thus, the second conduit 156 is movable as indicated by arrow N to lengthen and shorten the effective conduit length of the conduits 154, 156. In this case, the piston head 40 is adjusted to close off the inlet aperture 106 and function as a reflection surface for the system 152. In an alternate embodiment the system 152 could include multiple movable pipe members connected in series and/or parallel.

Referring now to FIGS. 16A and 16B, another alternate embodiment is shown. In this embodiment the engine comprises a transfer channel 42' between the crankcase and the combustion chamber 108. The transfer channel 42' has an exit 200 into the combustion chamber 108 and a branch 202 into a combined accumulator and adjustable wave reflection system 204. The system 204 includes two stationary conduit sections 206, 208 and a movable conduit section 210. The branch 202 extends into the first stationary conduit section 206 at aperture 211. In this embodiment a reed valve 212 is provided as a one-way flow check valve at the aperture 211. However, any suitable check valve could be provided. Fuel injectors 214, 215 can be connected to the first stationary conduit section 206. The fuel injector(s) can be controlled such as described in U.S. Pat. No. 5,259,344 which is hereby incorporated by reference in its entirety. One end of the first stationary conduit section 206 forms an outlet 216 into the combustion chamber 108. An opposite end of the first stationary conduit section 206 is connected to the movable conduit section 210. In this embodiment the movable conduit section 210 has a general "U" shape. One end of the general "U" shape extends into the first stationary conduit section 206 and an opposite end extends into the second stationary conduit section 208. In this embodiment the second stationary conduit section 208 has a permanently closed end 218 that forms a wave reflection surface. The movable conduit section 210 can be moved similar to a U-shaped trombone section to lengthen and shorten the wave reflection length from the outlet 216 to the end 218 and back to the outlet 216.

FIG. 17 shows another alternate embodiment. In this embodiment, similar to the embodiment shown in FIG. 10, the combined accumulator and wave reflector 230 has a rotatable member 232. In this embodiment the reflector section 234 is side branched off of the section 236 between the inlet and outlet apertures 238, 240. An end 242 of the rotatable member 234 is located in the circular conduit section 244. The end 242 can be moved in the circular conduit section 244 to lengthen or shorten the distance in the branch reflector section 234 between the end 242 and the aperture 240.

In alternate embodiments the reflection pipe conduits could have any suitable shape and could have wave multipliers or dividers. The reflector could also be turned on and off, such as by opening a reflector end for selectively actuating and deactuating effective combustion compression wave reflection by the reflector. In alternate embodiments the conduit does not need to be movable, but a reflection surface(s) could instead be movable to vary or alter the effective length. When the system uses a fuel injector, the controller could be programmed to operate the fuel injector in a first mode when the reflection system comprises a reflected combustion compression wave and in a second different mode when the reflection system does not comprise a reflected combustion compression wave, such as when the engine is initially started or has a misfire. The operational mode of the fuel injector can be related to the effective length of the reflection conduit. A controller can control both the effective length of the reflection conduit and the selection of the operational mode of the fuel injector based, at least partially, upon a predetermined parameter(s), such as engine speed.

The system as described above provides numerous new features. The small size of the injection aperture 30 allows for a sustained injection regardless of whether combustion occurred immediately before the injection cycle. The accumulator is a closed end system during the injection cycle for reflection purposes. The transfer channel can be opened before introduction of the fuel into the combustion chamber. Pressure in the accumulator is relieved or blown off in every cycle of the piston thereby reducing fuel leakage between the piston head and the cylinder wall from the injection port. Vacuum drawing of fuel into the accumulator proximate the injection inlet 30 can be used to simplify the type of fuel pump used, such as use of a simple diaphragm fuel pump. The length and shape of the accumulator conduit system can take advantage of the compression wave to deliver a reflected compression wave for enhanced fuel and compressed air delivery through the injection inlet 30. The reflected compression wave can atomize fuel in the inlet 30, push the injection through the inlet 30 faster, and also atomize fuel against substantially static air all ready in the combustion chamber. Thus, there is provided an accelerated late delivery of a portion of the fuel charge which is inherent to the present system. This late delivery reduces the amount and likelihood of unburned fuel short circuiting directly to the exhaust 28. Thus, hydrocarbon emissions are reduced. The reflected compression wave can be delivered to the injection aperture at the end of scavenging after BDC. The accumulator conduit has two variably open and closed ends to provide a closed end tuned pipe function as well as a compressed air accumulator function and an accumulator blow off pressure relieve function. Because of the opening and closing natures of the apertures 30, 38, no direct open path is provided between the cylinder and the crankcase by the accumulator. The tuned pipe feature of the accumulator conduit can be tuned, such as with an expansion chamber, to spread out the reflected compression wave to compensate for varying speeds of the engine. Fuel trapping is enhanced to about 80%–95%. Thus, fuel trapping losses can be as low as only 5%. In old style systems fuel trapping was only about 60%–70%. The present system has better fuel efficiency because of reduced scavenging or trapping loss, reduced combustion loss, and reduces occurrences of misfires because of better fuel efficiency or mixing from the reflected compression wave. The present invention can also be used as a self governing effect to prevent overspeed of an engine, such as in a chain saw, because the tuned pipe feature of the accumulator conduit can go out of tune at overly high speeds, thus losing the appropriate timed delivery of the fuel ramming feature of the reflected compression wave.

With features of the present invention, changing the effective length of the wave reflection pipe or channel can change the timing of delivery of the reflected wave back to a predetermined position. In addition, shape or volume variations (such as seen in FIG. 9) can change the shape of the wave. Changing the shape of the original wave relative to the reflected wave also affects the reflected wave delivery time. Changing the shape of a reflected wave from its original wave can, thus, change both delivery time as well as distribution of the reflected wave at its arrival. Any suitable means could be used to change the shape of the wave, such as increasing the volume of the wave reflection pipe, using multiple reflectors or reflection tubes, and/or using a side branch reflection tube(s) off of a main reflection tube. Wave shape change can also be combined with the feature of tube length variation, such as disclosed in FIGS. 10–17. Tube length variation can be controlled manually, or automatically, or perhaps semi-automatically. For the purely manual control, the user could move a movable tube section, such as between two positions when the engine is at idle and at wide open throttle (WOT). For automatic control, a movable tube section could be automatically moved, such as by a mechanical connection or use of an electronic controller, based upon a predetermined feature(s), such as engine speed, engine load, throttle position, fuel meter operation, temperature, pressure, exhaust condition(s), and/or a variable exhaust valve. For a semi-automatic control, this could include an automatic control which only becomes active or inactive after a user actuated control is moved, such as moving the choke. These are only some examples of control possibilities. Other control possibilities should become obvious to people skilled in the art after reading the above description.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In an internal combustion engine having a combustion chamber and a fuel delivery system for delivering fuel into the combustion chamber, the improvement comprising:
the fuel delivery system including a fuel entry proximate the combustion chamber and a combustion compression wave reflection conduit connected to the combustion chamber proximate the fuel entry, wherein the reflection conduit comprises a variable effective reflection length.

2. An engine as in claim 1 wherein an end of the reflection conduit is movable to vary the effective reflection length.

3. An engine as in claim 1 wherein a middle section of the reflection conduit is expandable.

4. An engine as in claim 3 wherein the middle section comprises a general sliding trombone member.

5. An engine as in claim 3 wherein the middle section comprises a telescoping member.

6. An engine as in claim 1 wherein an end of the reflection conduit comprises a portion of a rotational member.

7. An engine as in claim 1 wherein the reflection conduit comprises a first conduit member and a second conduit member movably connected to the first conduit member, wherein the engine further comprises a drive connected to second conduit member for moving the second conduit member relative to the first conduit member.

8. An engine as in claim 7 wherein the drive comprises a mechanical connection of the drive to an engine speed responsive member.

9. An engine as in claim 8 wherein the engine speed responsive member comprises a mechanical governor.

10. An engine as in claim 8 wherein the engine speed responsive member comprises a portion of a vehicle transmission.

11. An engine as in claim 7 further comprising a controller connected to the drive and at least one sensor connected to the controller, wherein the controller moves the drive based upon input from the sensor.

12. An engine as in claim 11 wherein the sensor is an engine speed sensor.

13. An engine as in claim 1 wherein a portion of the reflection conduit comprises a scavenged air passage between a crankcase of the engine and the combustion chamber.

14. An engine as in claim 1 wherein an end of the reflection conduit, forming a reflection area, is selectively openable.

15. An engine as in claim 1 wherein an end of the reflection conduit, forming a reflection area, is permanently closed.

16. An engine as in claim 1 wherein the fuel delivery system comprises a fuel injector, and wherein the engine further comprises a controller connected to the fuel injector, the controller being adapted to operate the fuel injector in a first mode when the reflection system comprises a reflected combustion compression wave and in a second different mode when the reflection system does not comprise a reflected combustion compression wave.

17. An engine as in claim 16 wherein the controller is adapted to select the operational mode of the fuel injector based, at least partially, upon the effective length of the reflection conduit.

18. An engine as in claim 17 wherein the controller controls the effective length of the reflection conduit, and selection of the operational mode of the fuel injector is based, at least partially, upon speed of the engine.

19. An internal combustion engine fuel delivery assist comprising:

a combustion compression wave reflector; and a control system connected to the reflector for at least partially controlling the reflector to vary timing of delivery of a reflected combustion compression wave to a predetermined location of an engine.

20. A fuel delivery assist as in claim 19 wherein the reflector comprises a variable effective reflection length.

21. A fuel delivery assist as in claim 20 wherein the reflector comprises a reflection conduit comprising a first conduit member and a second conduit member movably connected to the first conduit member.

22. A fuel delivery assist as in claim 21 wherein the control system comprises a drive for automatically moving the second conduit member.

23. A fuel delivery assist as in claim 22 wherein the control system further comprises a controller connected to the drive and at least one sensor for sensing at least one characteristic of the engine.

24. A fuel delivery assist as in claim 22 wherein the drive comprises a mechanical connection to a movable component of the engine.

25. In an internal combustion engine having a combustion chamber and a fuel delivery system for delivering fuel into the combustion chamber, the improvement comprising:

the fuel delivery system including a fuel entry proximate the combustion chamber and a combustion compression wave reflector connected to the combustion chamber, wherein the reflector is variable based upon at least one engine operating parameter of the engine.

26. An internal combustion engine fuel delivery assist system comprising:

a variable combustion compression wave reflector comprising a reflection conduit; and a control system for selectively actuating and deactuating effective combustion compression wave reflection by the reflector.

27. A method of delivering pressure pulses in an internal combustion engine, the method comprising steps of:

producing a combustion compression wave from combustion in a combustion chamber of the engine;

conduiting at least a portion of the wave in a reflection pipe conduit connected to the combustion chamber;

reflecting the wave portion in the conduit back towards the combustion chamber; and varying timing of delivery of the reflected wave portion back to the combustion chamber.

28. A method as in claim 27 wherein the step of varying timing comprises changing an effective pipe length of the reflection pipe conduit.

29. A method as in claim 28 wherein the effective pipe length decreases relative to an increase in speed of the engine.

30. A method of delivering air from a compressed air assisted fuel injection system into a cylinder of an internal combustion engine comprising steps of:

compressing air into an accumulator of the injection system;

releasing a first amount of the compressed air out the accumulator and through an injection port into the cylinder at a first pressure; and releasing a subsequent second amount of the compressed air out the accumulator and through the injection port into the cylinder at a second pressure higher than the first pressure.

31. A method as in claim 30 wherein the step of compressing air comprises pushing air from a crankcase of the engine into the accumulator.

32. A method as in claim 30 wherein the step of releasing a subsequent second amount of compressed air comprises delivering a reflected compression wave at the injection port from the accumulator, the reflected compression wave being generated from a combustion generated compression wave.

33. A method as in claim 30 further comprising releasing a subsequent third amount of the compressed air out of the accumulator and through the injection port into the cylinder at a third different pressure.

34. A method as in claim 30 further comprising releasing a buffer of combustion gases from the injection port before releasing the first amount of compressed air.

35. A method of delivering fuel and air from a compressed air assisted fuel injection system into a cylinder of an internal combustion engine comprising steps of:

providing the injection system with a compressed air accumulator having a channel between a crankcase of the engine and the cylinder;

delivering a first amount of fuel and compressed air from the channel into the cylinder; and delivering a subsequent second amount of fuel and compressed air at a second higher rate from the channel into the cylinder, wherein the steps of delivering the first and second amounts occur in a single injection cycle.

36. A method as in claim 35 further comprising delivering a third amount of fuel and compressed air at a third rate different than the second rate from the channel into the cylinder in the single injection cycle.

* * * * *